MONEY-ACTUATED DEVICES

Filed June 19, 1961

INVENTORS
RAY G. ELLIS
JAMES N. STURDY

Roy Eilers
ATTORNEY

INVENTORS
RAY G. ELLIS
JAMES N. STURDY
Ray Eiler
ATTORNEY.

INVENTORS
RAY G. ELLIS
JAMES N. STURDY
Ray Eilers
ATTORNEY

*INVENTORS*
RAY G. ELLIS
JAMES N. STURDY

ATTORNEY

INVENTORS
RAY G. ELLIS
JAMES N. STURDY
Ray Eilers
ATTORNEY

United States Patent Office 3,219,858

Patented Nov. 23, 1965

3,219,858

MONEY-ACTUATED DEVICES

Ray G. Ellis, St. Louis, and James N. Sturdy, Manchester, Mo., assignors to National Rejectors, Inc., St. Louis, Mo., a corporation of Missouri Filed June 19, 1961, Ser. No. 118,056
20 Claims. (Cl. 310—77)

Figure 1:
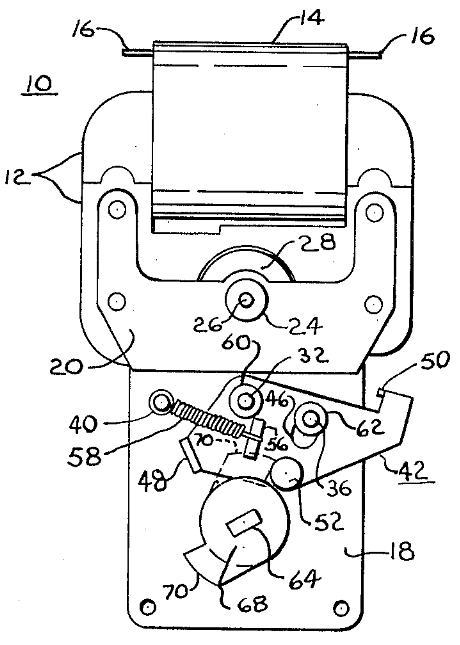

This invention relates to improvements in money-actuated devices. More particularly, this invention relates to improvements in control devices that can prevent undesired continued revolutions of shafts.

It is, therefore, an object of the present invention to provide an improved control device that can prevent undesired continued revolutions of a shaft.

It is frequently necessary, in a device, to rotate a shaft through just one revolution and then bring that shaft to rest before a subsequent revolution of that shaft can be initiated and completed. For example, in a change-making device or in a product-vending device, it is necessary that the shaft of that device be rotated through just one revolution and then brought to rest before a second revolution of that shaft is initiated and completed. To permit that shaft to make a second revolution without first coming to rest would be undesirable because that second revolution could lead to the dispensing of change or to the vending of a product without the insertion of further money. The recognition of this fact, a number of control devices have been proposed which were intended to cause a shaft to make one complete rotation and then come to rest before making a second revolution.

Most of those control devices relied upon switches that were intended to break the circuits to the motors after the output shafts of those motors had completed one revolution and before those shafts could initiate and complete a second revolution. Some of those control devices have been used, and a number of those control devices have been effective. However, switches are expensive; and hence control devices that rely upon switches can be expensive. Further, control devices which rely upon switches require additional circuitry and usually require cams and levers to actuate those switches. It would be desirable to provide a control device which did not rely upon switches but which could rotate a shaft through just one complete revolution and could prevent the initiation and completion of a second revolution of that shaft unless the motor driving that shaft came to rest after the completion of the first revolution of that shaft. The present invention provides such a control device; and it is, therefore, an object of the present invention to provide a control device which does not rely upon switches but which can rotate a shaft through just one revolution and can prevent the initiation and completion of a second revolution of that shaft unless the motor driving that shaft comes to rest after the completion of the first revolution of that shaft.

The present invention utilizes a latch which is engaged by a cam on the output shaft of a motor and is thereby moved up into engagement with the stator of that motor. That latch will then be held up in engagement with that stator as long as that motor is energized but will move back to its normal position as that motor becomes de-energized. That latch has an abutment which will move into position behind the cam but in the path of the cam as that latch is moved up into engagement with the stator; but if the motor becomes de-energized at the end of one complete revolution of the output shaft of that motor, as will normally be the case, the abutment on that latch will move out of the path of the cam on the output shaft of the motor as that latch returns to its normal position. As a result, under normal conditions of operation, the abutment on the latch will be moved into position behind the cam but in the path of the cam during each revolution of the output shaft of that motor but will move out of the path of that cam prior to the initiation of a second revolution of that output shaft. However if, for some reason, the motor does not become de-energized at the end of one complete revolution but, instead, continues to be energized, the latch will be unable to move back to its normal position and the abutment on that latch will be unable to move out of the path of the cam on the output shaft of the motor. As a result, that cam will promptly engage that abutment and will be positively held and locked, and will thus prevent further rotation of the output shaft of the motor. In this way, the latch will be moved into and out of blocking position during each normal revolution of the output shaft of the motor and will remain in blocking position only if the motor fails to become de-energized before the initiation and completion of a second revolution of that output shaft. It is, therefore, an object of the present invention to provide a latch on a motor which is movable into and out of blocking position during each normal revolution of the output shaft of that motor and which will remain in blocking position only if the motor fails to become de-energized before the initiation and completion of a second revolution of that output shaft.

The latch of the present invention provides a positive mechanical blocking of undesired continued rotation of the output shaft of a motor; and such blocking is more positive and more definite than is the mere actuation of the switches which are intended to de-energize a motor. While proper actuation of the switches could block undesired continued rotation of the output shaft of the motor, sticking of one of those switches or breaking of the resilient element in one of those switches could cause those switches to permit undesired continued rotation of the output shaft of the motor. As a result, the present invention provides a positive and mechanical blocking of undesired continued rotation of the output shaft of a motor.

Once the cam on the output shaft of the motor has engaged the abutment on the latch, the inertia and friction and mechanical advantage of the gear train of that motor will prevent any reverse rotation of that output shaft which could permit the latch to move away from the stator of the motor and thereby move the abutment out of the path of the cam. This is desirable because it means that once the latch has intercepted the cam on the output shaft of the motor, that output shaft can not be caused to initiate and complete a further revolution until after the source of trouble, which kept the motor energized, has been located and eliminated.

The present invention obviates undesired, additional revolutions of the output shaft of the motor by acting directly upon that output shaft. Such direct action is important and desirable because it applies the corrective force at the very point where it is needed. Further, in the event the latch were to fail to return to its normal position, because of the breaking of the spring that normally biases it to that position, undesired, additional revolutions of the output shaft of the motor would be prevented. This means that the latch provided by the present invention will "fail safe" and will thus perform its protective function even though the spring therefor should break.

Where the output shaft, that is to be kept from making successive revolutions without intervening de-energizations of the motor, is driven by a small or moderately-sized motor, it will be desirable to have the latch act directly upon that output shaft. However, where that output shaft is driven by a large motor, it will not be desirable to have the latch act directly upon that output shaft. Instead, it will be desirable to have that latch act upon that shaft of the motor which supports the rotor of that motor, because that shaft can apply less torque than can the output shaft of the motor. The present invention enables the latch to act upon that shaft of the motor on which the rotor of the motor is mounted; and it is, therefore, an object of the present invention to provide a motor with a latch which can act upon the rotor-supporting shaft of that motor to prevent undesired continued revolutions of the output shaft of that motor.

Other and further objects and advantages of the present invention should become apparent from an examination of the drawing and accompanying description.

In the drawing and accompanying description, two preferred embodiments of the present invention are shown and described but it is to be understood that the drawing and accompanying description are for the purpose of illustration only and do not limit the invention and that the invention will be defined by the appended claims.

Figure 2:
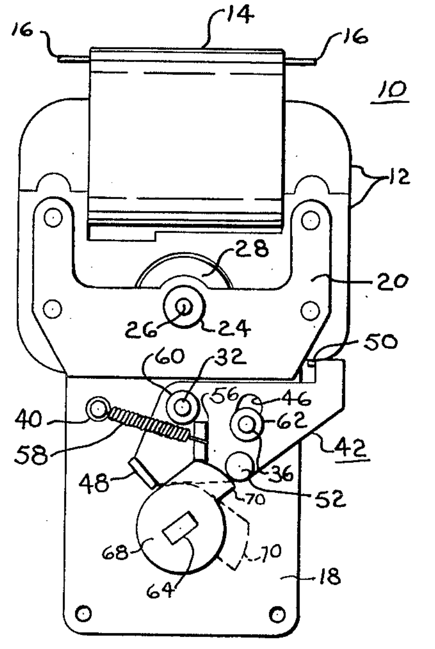
Figure 3:
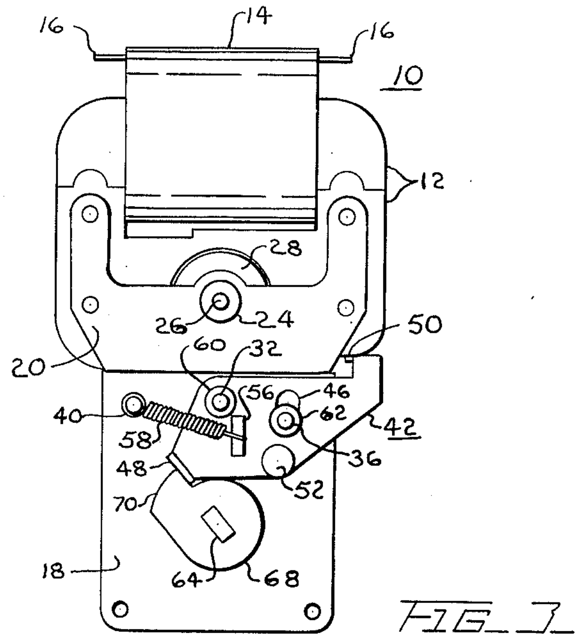
Figure 4:
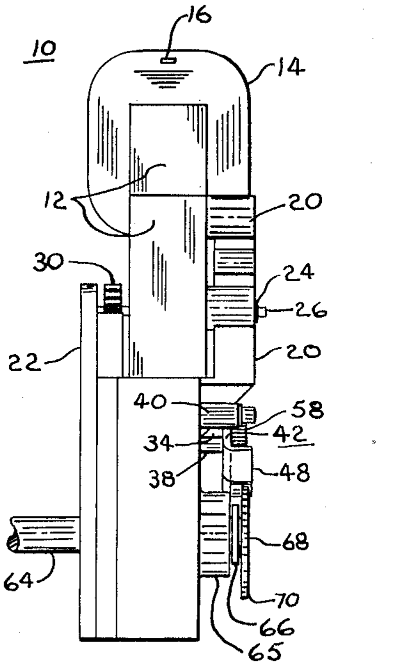
Figure 5:
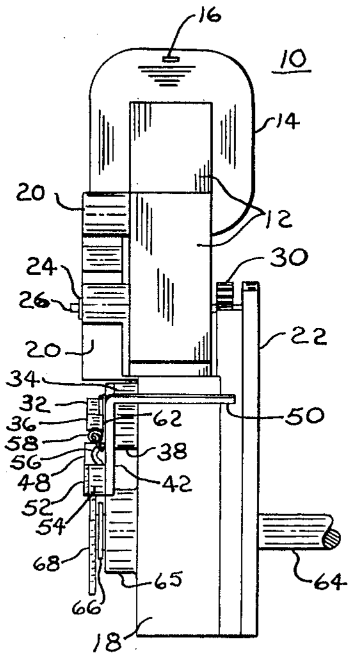
Figure 6:
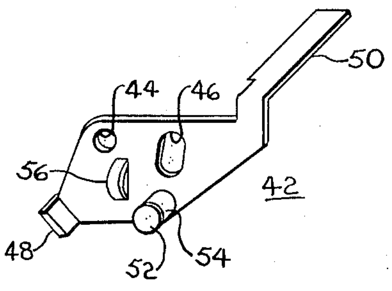
Figure 7:
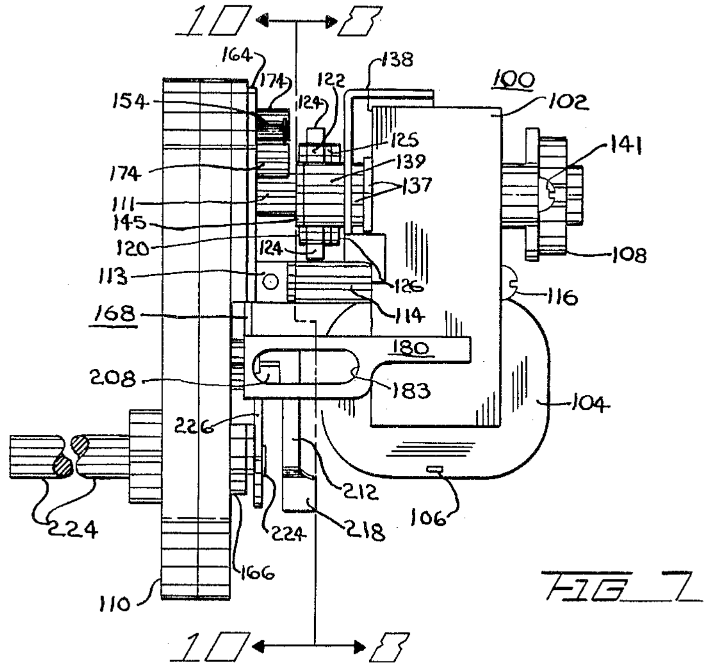
Figure 8:
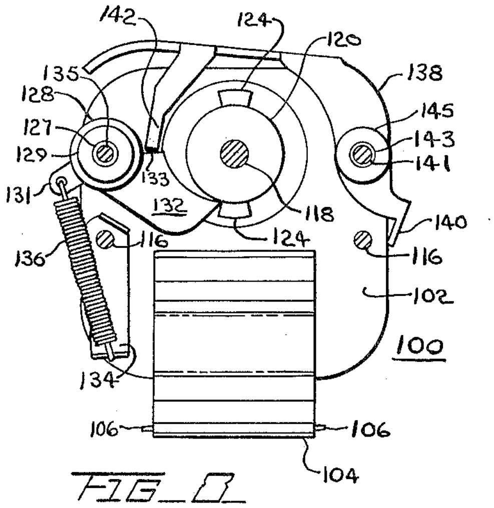
Figure 9:
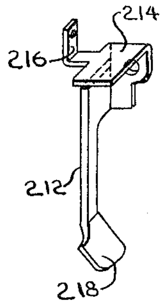
Figure 10:
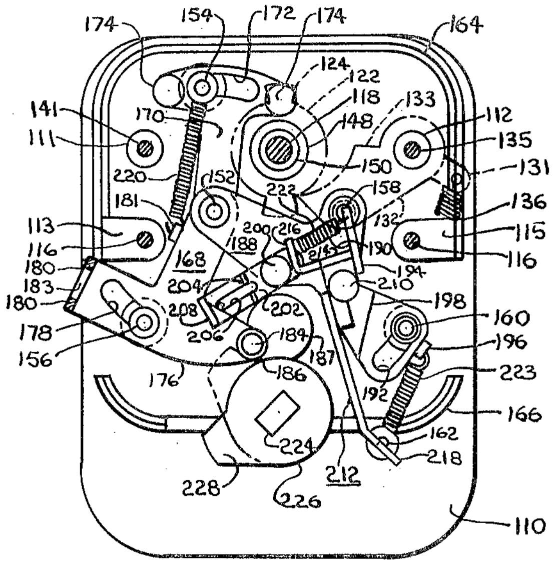
Figure 11:
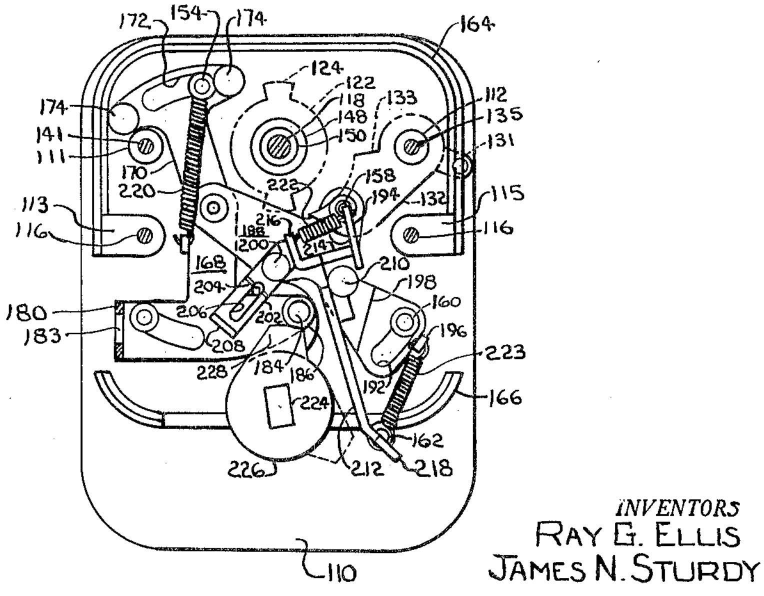
Figure 12:
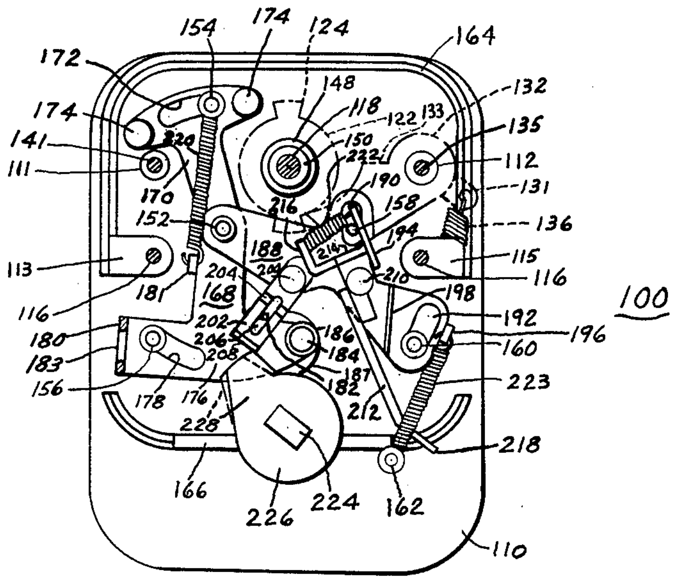
Figure 13:
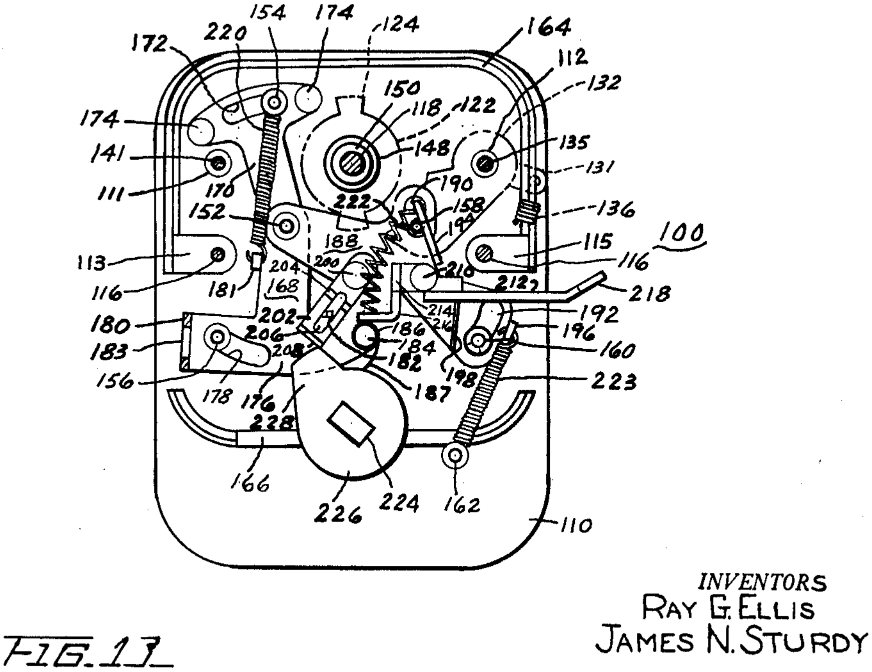

In the drawing, FIG. 1 is a front elevational view of one embodiment of motor that is made in accordance with the principles and teachings of the present invention, and it shows the normal position of the latch and cam by solid lines, FIG. 2 is a view that is generally similar to the view in FIG. 1, but it shows the latch and cam in moved position by solid lines, FIG. 3 is a view that is generally similar to the view in FIG. 1, but it shows the latch and cam in blocking position, FIG. 4 is a left-hand view of the motor shown in FIG. 1, FIG. 5 is a right-hand view of the motor shown in FIG. 1, FIG. 6 is a perspective view of the latch which is part of the motor of FIG. 1, FIG. 7 is a side elevational view of another embodiment of motor that is made in accordance with the principles and teachings of the present invention, FIG. 8 is a sectional view through the motor of FIG. 7, and it is taken along the plane indicated by the line 8—8 in FIG. 7, FIG. 9 is a perspective view of a re-setting lever that is used in the motor of FIG. 7, FIG. 10 is another sectional view through the motor of FIG. 7, and it is taken along the plane indicated by the line 10—10 in FIG. 7, FIG. 11 is a sectional view which is similar to the view shown by FIG. 10, but it shows output shaft of the motor after that output shaft has completed part of a revolution, FIG. 12 is another sectional view which is similar to the view shown by FIG. 10, but it shows the output shaft of the motor after that output shaft has begun a second revolution, and FIG. 13 is still another sectional view which is similar to the view shown by FIG. 10, but it shows the components of the motor as those components are being reset.

Referring to the drawing in detail, the numeral 10 generally denotes one embodiment of motor that is made in accordance with the principles and teachings of the present invention; and that motor is preferably a shaded pole motor. The motor 10 has a stator 12 which consists of a number of laminations that are suitably secured together to form the requisite magnetic path for the flux lines that are generated by the coil 14 which is mounted on that stator. That coil has terminals 16 extending therefrom, and those terminals will be suitably connected to a source of power.

A housing 18 is provided for the gear train which is associated with, and is a part of, the motor 10; and that gear train will provide a material reduction in speed between the input thereof and the output thereof. An extension 20 is provided at the front of the gear housing 18, and that extension extends upwardly into position to overlie the lower part of the front of the stator 12 of the motor 10. An extension 22 is provided at the rear of the gear housing 18, and that extension extends upwardly into position to overlie the lower part of the rear of the stator 12 of the motor 10. A bushing 24 is supported by the extension 20, and a similar bushing, not shown, is supported by the extension 22. Those bushings are in alinement and they support the shaft 26 of the motor 10 so that shaft can both reciprocate and rotate relative to those bushings. The shaft 26 has the rotor 28 of the motor fixedly mounted on it, and that rotor will both rotate and reciprocate with that shaft.

A gear 30 loosely rotates on the shaft 26, and that gear is the input gear of the gear train within the gear housing 18. A helical spring, not shown, is telescoped over the shaft 26; and the opposite ends of that spring bear against the gear 30 and the rotor 28. That spring urges the shaft 26 and the rotor 28 to the right in FIG. 4, but it can yield to permit that shaft and rotor to shift to the left. An abutment, not shown, on the rear face of the rotor 28 can engage an abutment, not shown, on the front face of the gear 30 to interconnect that rotor and that gear for conjoint rotation, whenever the rotor 28 and the shaft 26 move to their rearmost positions as the coil 14 is energized. However, whenever the coil 14 is not energized, the spring will urge the rotor 28 and the shaft 26 forwardly into positions where that rotor is free of the gear 30. The abutments on the rotor 28 and gear 30 thus act as a clutch to cause rotation of the gears of the gear train only as long as the coil 14 of the motor 10 is energized.

The numeral 32 denotes a pivot which extends forwardly from a boss 34 on the front of the gear housing 18. If desired, that pivot can be an integral part of that boss and can be formed at the time the front of the gear housing 18 is cast. A pin 36 extends forwardly from a boss 38 on the front of the gear housing 18, and that pin also can be made integral with the boss 38. A boss 40 is provided on the front of the gear housing 18, and that boss has a reduced-diameter front end.

The numeral 42 generally denotes a latch which is a part of the motor 10; and that latch is preferably made from a flat plate of magnetic material. That latch has a circular opening 44 through it, and that opening telescopes over the pivot 32. That opening will coact with that pivot to permit rotation of the latch 42 relative to the gear housing 18. A slot 46 is provided in the latch 42 to the right of the opening 44, as that slot and opening are viewed in FIG. 6; and that slot telescopes over the pin 36 on the boss 38. That slot will coact with that pin to permit limited rotation of the latch 42 relative to the gear housing 18. An ear 48 is bent forwardly from the plane of the latch 42, and an ear 50 is bent rearwardly from the plane of that latch. The ears 48 and 50 are study and rugged, and they are bent at ninety degrees to the plane of the latch 42. A headed pin 52 has the shank thereof telescoped through a roller 54 and then suitably secured to the latch 42; and that pin permits the roller 54 to rotate relative to the latch 42 while maintaining that roller in assembled relation with that latch. A portion 56 of the latch 42 is punched forwardly from the plane if that latch to define a slot or opening.

The opening 44 is telescoped over the pivot 32 and thereafter a retainer 60 is pressed onto the pivot 32 to prevent accidental separation of the latch 42 from that pivot while permitting rotation of that latch relative to that pivot. At the time the opening 44 is telescoped over the pivot 32, the slot 46 is telescoped over the pin 36; and thereafter a retainer 62 is pressed onto that pin to help prevent accidental separation of the latch 42 from the gear housing 18. Once the opening 44 and the slot 46 have, respectively, been telescoped over the pivot 32 and the pin 36, one end of the spring 58 will be hooked through the opening or slot formed by the punched-out portion 56 of the latch 42, and the other end of that spring will be hooked around the reduced diameter, front portion of the boss 40. That spring will bias the latch 42 for rotation in the clockwise direction in FIG. 1, but that spring can yield to permit rotation of that latch in the counter clockwise direction.

The numeral 64 denotes the output shaft of the gear train within the gear housing 18; and that output shaft is, effectively, the output shaft of the motor 10. That output shaft extends forwardly from a boss 65 on the front of the gear housing 18, and that output shaft also extends rearwardly from the rear of that gear housing. The rearwardly extending portion of the output shaft 64 will be suitably connected to the device or control mechanism which is to be rotated through one revolution and then brought to rest during each normal cycle of operation of that output shaft. A washer 66 encircles the front portion of the output shaft 64, and a cam 68 is fixedly secured to the front end of that output shaft; and the washer 66 is interposed between the cam 68 and the boss 65. The cam 68 has an ear 70 projecting out from the generally circular periphery of that cam. The spacing between the ear 48 and the roller 54 on the latch 42 is such that the ear 70 can pass beneath and not engage the ear 48 but will engage the roller 54 whenever that latch is in the position shown by FIG. 1.

The spring 58 normally holds the roller 54 in engagement with the generally circular periphery of the cam 68, and hence holds that roller in the path of the ear 70 on that cam. As a result, whenever the output shaft 64 rotates in the clockwise direction in FIG. 1, in response to energization of the coil 14, the ear 70 will engage the roller 54 held by the pin 52. That engagement will force that roller to move to the right, and that movement will cause the latch 42 to rotate in the counter clockwise direction until the ear 50 abuts the stator 12 of the motor 10. The fact that the latch 42 is made out of magnetic material enables the magnetic field of the coil 14 to act through the stator 12 to hold the ear 50 immediately adjacent that stator, as shown particularly by FIG. 2.

FIG. 1 shows the normal position of the gear 70 on the ear 68 by solid lines; and it shows the position of that ear, at the time it moves into engagement with the roller 54, by dotted lines. Prior to the time that ear moves into the dotted line position shown by FIG. 1, that ear will pass beneath the ear 42; and the ear 70 will be able to pass under the ear 48 without engaging that ear. FIG. 2 shows, by solid lines, the position of the ear 70 after that ear has forced the latch 42 into the position where the ear 50 will be held by the magnetic field from the coil 14. FIG. 2 also shows, by dotted lines, the position of that ear after it has moved beyond the roller 54; and it shows that even though that ear has moved beyond that roller, the latch 42 will continue to be held in its upper position by the magnetic field of the coil 14. At this time the latch 42 is physically interposed between the ear 70 on the cam 68 and the stator 12.

When the output shaft 64 again reaches the position indicated by FIG. 1, and the ear 70 is again in the solid line position shown by FIG. 1, the coil 14 should be de-energized by the cycling device of the change-making, product-vending or other device with which the motor 10 is used. At such time, the output shaft 64 should come to rest and the spring 58 should pull the ear 50 downwardly away from the stator 12, and thus move the ear 48 on the latch 42 out of the path of the ear 70 on the cam 68. This means that the motor 10 will be in position to provide a further complete revolution of the output shaft 54 upon a subsequent energization of the coil 14 by the cycling device of the change-making, product-vending or other device with which the motor 10 is used. However, if the coil 14 did not become de-energized but, instead, remained energized, the spring 58 would not have been able to return the latch 42 to its normal position. Instead, that latch would continue to be held in the raised position shown by FIG. 2 and FIG. 3 by the magnetic field of the coil 14; and hence the ear 48 thereon would still be in the path of the ear 70 on the cam 68. As a result, continued rotation of the output shaft 64 in the clockwise direction would move the ear 70 on the cam 68 into engagement with the ear 48 on the latch 42. That engagement would tend to rotate the latch 42 even further in the counter clockwise direction, but the engagement between the ear 50 and the stator 12 will prevent such rotation; and hence the latch 42 will hold the ear 48 solidly in the path of the ear 70. The overall result is that the latch 42 will positively and mechanically block further rotation of the output shaft 64 in the clockwise direction. This means that even though the coil 14 continues to remain energized, the motor 10 will not be able to provide a second revolution of the output shaft 64. This is desirable because that motor should not provide any second revolutions of that shaft without intervening de-energizations of the coil 14.

Once the ear 70 has engaged the ear 48, the gear train within the gear housing 18 will have enough inertia and friction and mechanical advantage to continue to hold the ear 70 on the cam 68 solidly in holding engagement with the ear 48 on the latch 42 even though someone applies heavy and sharp blows to the device with which the motor 10 is used. Further, the inertia and friction and mechanical advantage of that gear train will hold the ear 70 on the cam 68 in engagement with the ear 48 on the latch 42, and thereby keep that latch from returning to its normal position, even if the fuse were to be removed and replaced or the plug, for the device with which the motor 10 is used, were to be removed from and then reinserted in the electrical outlet. As a result, the motor 10 will be able to positively prevent the initiation and completion of the second cycle of operation of that device until after a service man has located the source of trouble which prevented the de-energization of the coil 14 at the end of the first revolution of the output shaft 64.

It will be noted that the operation of the latch 42 is automatic and is wholly independent of any additional switches or circuitry. Further, it will be noted that the operation of that latch is direct and positive. In addition, it will be noted that if the spring 58 were to break and thus become unable to move the latch 42 back to its normal position, the motor 10 will "fail safe" and thereby prevent continued rotation of the output shaft 64. The overall result is that the present invention provides, in a simple, direct and inexpensive manner, full, automatic and complete protection against the rotation of the output shaft of a motor through a second revolution without an intervening de-energization of that motor.

The motor of the present invention can be used as the motor of many different devices. One device which could use the motor 10 as the motor thereof is the change-making device which is disclosed in co-pending Melvin et al. application Serial No. 767,381 for Coin Separators which was filed October 15, 1958.

Whenever the ear 70 on the cam 68 engages and is held by the ear 48 on the latch 42, a service man will inspect the device with which the motor 10 is used and will locate the source of trouble which kept the coil 14 from becoming de-energized. Once he has located and eliminated that source of trouble, the service man will then rotate the output shaft 64 far enough in the counter clockwise direction to free the latch 42 for rotation to its normal position. At such time, the device with which the motor 10 is used will be ready for further operation.

Referring to FIGS. 7–13, the numeral 100 generally denotes a second embodiment of motor that is made in accordance with the principles and teachings of the present invention. That motor is preferably a shaded pole motor, and it has a stator 102. That stator consists of a number of laminations which are suitably secured together to form the requisite magnetic path for the flux lines generated by the coil 104 which is mounted on that stator. Terminals 106 are provided for the coil 104, and those terminals will be suitably connected to a source of power. The numeral 108 denotes a bearing bracket which has the opposite ends thereof secured to the stator 102 of the motor 100 but which has the center portion thereof spaced from that stator.

The numeral 110 denotes a housing for the gear train which is associated with, and is a part of, the motor 100. Bosses 111 and 112 are formed on the inner face of that housing, and those bosses extend toward the stator 102 of the motor 100. Further bosses 113 and 115 are formed on the inner face of the gear housing 110, and those further bosses also extend toward the stator 102 of the motor 100. Spacers 114 are disposed between the inner faces of the bosses 113 and 115 and the stator 102 of the motor, and fasteners 116 extend through the stator 102 and through the spacers 114 and seat in threaded sockets in the bosses 113 and 115. Those fasteners coact with those spacers and with those bosses to help hold the gear housing 110 fixedly spaced from the stator 102.

The shaft of the motor 100 is denoted by the numeral 118; and that shaft has one end thereof rotatably held by the bearing bracket 108 while the other end thereof is held by a bushing 150 in a boss 148 at the inner face of the gear housing 110. A disc 120 is pressed onto the shaft 118; and a disc 122 with radially-projecting ears 124 is mounted on that shaft adjacent that disc. Further discs 125 and 126 are telescoped onto the shaft 118; and the disc 125 abuts the disc 122. The disc 125 is preferably made from a material, such as synthetic rubber, that has a high coefficient of friction. The discs 120 and 126 are preferably made of metal and will be pressed solidly onto the shaft 118 and will hold the discs 122 and 125 in intimate contact. The discs 120, 125 and 126 will thus coact to fixedly hold the disc 122 against axial or circumferential shifting relative to the shaft 118.

The numeral 127 denotes an elongated tube which has one end thereof extending through a passage in the stator 102 and lodging within an opening in the bearing bracket 108. The other end of that tube projects from the stator 102 and abuts the inner end of the boss 112. A spacer, not shown, telescopes over the tube 127 and abuts the stator 102; and a braking pawl 132 telescopes over the tube 127 and abuts the said spacer. A washer 128 telescopes over the tube 127 and abuts the braking pawl 132; and a disc 129 telescopes over the tube 127 and abuts the washer 128. The disc 129 will maintain the said spacer, the braking pawl 132 and the washer 128 in assembled relation with the tube 127 while permitting rotation of that braking pawl relative to that tube. A fastener 135 extends through the opening in the bearing bracket 108 and through the tube 127 and seats in a threaded socket in the boss 112; and that fastener will help hold the bearing bracket 108 and the gear housing 110 in assembled relation with the stator 102.

The braking pawl 132 has a pointed free end, and that free end extends to the right in FIG. 8. That braking pawl has an ear 131 thereon, and that ear has an opening therein. That braking pawl also has a shoulder 133 thereon, and that shoulder is intermediate the tube 127 and the free end of that braking pawl.

A bracket 134 is suitably secured to the stator 102, and that bracket has an ear with an opening therein. A helical extension spring 136 has one end thereof hooked through the opening in the ear on the bracket 134, and has the other end thereof hooked through the opening in the ear 131 on the braking pawl 132. That spring biases the free end of the braking pawl 132 into the path of the ears 124 on the disc 122, but that spring can yield to permit that pawl to rotate to the position shown by FIG. 11.

The numeral 143 denotes an elongated tube which has one end thereof extending through a second passage in the stator 102 and lodging within a second opening in the bearing bracket 108. The other end of that tube projects from the stator 102 and abuts the inner end of the boss 111. A pair of washers 137 telescope over the tube 143 and abut the stator 102; and a lever 138 of magnetic material telescopes over the tube 143 and abuts that washer 137 which is remote from the stator 102. A spacer 139 telescopes over the tube 143 and abuts the lever 138, and a disc 145 telescopes over the tube 143 and abuts the spacer 139. The disc 145 will maintain the washers 137, the lever 138 and the spacer 139 in assembled relation with the tube 143 while permitting rotation of that lever relative to that tube. A fastener 141 extends through the second opening in the bearing bracket 108 and through the tube 143 and seats in a threaded socket in the boss 111; and that fastener will help hold the bearing bracket 108 and the gear housing 110 in assembled relation with the stator 102.

The lever 138 has an ear 140 thereon, and also has an ear 142 thereon. The ear 140 is disposed adjacent one side of the stator 102, and the ear 142 is disposed adjacent the shoulder 133 on the braking pawl 132. The ear 142 will normally abut the shoulder 133 on the braking pawl 132; and that ear can respond to downward movement of the lever 138 to rotate that braking pawl in the clockwise direction in FIG. 8. The extent of the downward movement of the lever 138 will be limited by the engagement of that lever with the top of the stator 102; and the extent of the upward movement of that lever will be limited by the engagement of the ear 140 with the said one side of the stator 102.

The numeral 152 denotes a shouldered pin which is provided at the inner face of the gear housing 110, and that pin is disposed adjacent a horizontal line which extends between the bosses 113 and 115 in FIG. 10. A second shouldered pin 154 is provided at the inner face of the gear housing 110, and that pin is disposed above the level of the pin 152 and is generally in vertical registry with that pin. A shouldered pin 156 is provided at the inner face of the gear housing 110, and that shouldered pin is disposed below the level of, and is disposed to the left of, the shouldered pin 152, as those pins are viewed in FIG. 10. A shouldered pin 158 is provided at the inner face of the gear housing 110, and that shouldered pin is disposed to the right of, and on the same level as, the shouldered pin 152, as those pins are viewed in FIG. 10. A shouldered pin 160 is provided at the inner face of the gear housing 110; and that pin is disposed to the right of, and is on the same level as, the shouldered pin 156, as those pins are viewed in FIG. 10. A pin 162 is provided at the inner face of the gear housing 110 below the level of the shouldered pin 160.

A stiffening rib 164 is formed at the inner face of the gear housing 110, and that rib extends vertically upwardly from the boss 113, extends horizontally across the inner face of the gear housing 110 adjacent the upper end of that inner face, and then extends vertically downwardly to the boss 113. A stiffening rib 166 also is formed at the inner face of the gear housing 110, and that stiffening rib is disposed below the level of the shouldered pins 156 and 160 and is disposed immediately above the pin 162. The opposite ends of the stiffening rib 166 curve upwardly toward the bosses 113 and 115.

The numeral 168 generally denotes a lever which has a central opening that telescopes over the shouldered pin 152. The engagement between that pin and that opening enables the lever 168 to rotate relative to the gear housing 110 and relative to the stator 102. A suitable fastener will be telescoped over the inner end of the shouldered pin 152 to prevent accidental separation of the lever 168 from that shouldered pin. The lever 168 has an upwardly-extending, T-shaped portion 170; and that portion has an arcuate slot 172 therein. That slot is directed generally perpendicularly to the stem of the T-shaped portion 170 as shown by FIG. 10. Weights 174 are secured to the T-shaped portion 170 adjacent the opposite ends of the slot 172, and those weights extend away from the gear housing 110. The lever 168 has a downwardly-extending, T-shaped portion 176; and the stem of that T-shaped portion is displaced angularly from the stem of the T-shaped portion 170. A slot 178 is formed in the T-shaped portion 176; and an ear 180 is formed on that T-shaped portion adjacent one end of the slot 178. The ear 180 is elongated and it extends at right angles to the plane of the lever 168; and it has an opening 183 therein. A second ear 181 is provided on the T-shaped portion 176 of the lever 168, but that ear is much shorter and much narrower than the ear 180. The ear 181 is disposed adjacent the shouldered pin 152, as that pin and that ear are viewed in FIG. 10. A third ear 182 is formed on the T-shaped portion 176 of the lever 168, and that ear also extends inwardly from the plane of the lever 168. That ear is disposed to the right of the stem of the T-shaped portion 176 of the lever 168, as that ear is viewed in FIG. 10. A pin 184 extends through a roller 186 and then seats in the right-hand end of the T-shaped portion 176 of the lever 168, as that lever is viewed in FIG. 10. That pin will prevent accidental separation of the roller 186 from the lever 168 but will permit ready rotation of that roller relative to that lever.

The slot 172 in the lever 168 telescopes over the inner end of the shouldered pin 154, and the slot 178 in that lever telescopes over the inner end of the shouldered pin 156. Suitable fasteners will be used to prevent accidental separation of that lever from the shouldered pins 154 and 156.

A spacer 187 is provided at the inner face of the gear housing 110, and that spacer underlies the right-hand end of the T-shaped portion 176 of the lever 168. That spacer has a thickness which is comparable to the thickness of the shoulders of the shouldered pins 152, 154 and 156. As a result, that spacer will not interfere with ready rotation of the lever 168, but will help keep the right-hand portion of the T-shaped section 176 of the lever 168 from tilting toward the inner face of the gear housing 110.

The numeral 188 generally denotes a lever which has an opening in the left-hand end thereof; and that opening is telescoped over the shouldered pin 152 before the fastener is assembled with that pin to prevent accidental separation of the lever 168 from that pin. As a result, that fastener will also prevent accidental separation of the lever 188 from the pin 152. An arcuate slot 190 is formed in the lever 188, and that slot telescopes over the shouldered pin 158. A second arcuate slot 192 is formed in the lever 188, and that slot telescopes over the shouldered pin 160. The slots 190 and 192 permit limited rotation of the lever 188 relative to the shouldered pins 152, 158 and 160, and hence relative to the gear housing 110 and the stator 102. An ear 194 is formed on the lever 188 adjacent the slot 190, and the upper end of that ear overlies part of that slot. A second ear 196 is provided on the lever 188 adjacent the slot 192; and both of the ears 194 and 196 have openings therein. An offset 198 is provided in the lever 188; and that offset disposes the right-hand end of that lever closer to the inner face of the gear housing 110 than is the rest of that lever. That offset places the right-hand end of the lever 188 in the same plane in which the lever 168 lies.

The numeral 200 denotes a pivot which is secured to and carried by the lever 188; and that pivot rotatably supports a short lever 202. That lever has an offset 204 in it which disposes the lower portion thereof rearwardly of the upper portion thereof; and that offset places the lower portion of the lever 202 in the plane of the left-hand portion of the lever 188. A slot 206 is formed in the rearwardly-offset portion of the lever 202, and that slot extends into the offset 204 and also extends a very short distance into the upper portion of the lever 202. An ear 208 is provided on the offset lower portion of the lever 202, and that ear extends at right angles to the plane of the offset portion of that lever. The slot 206 telescopes over the ear 182 on the T-shaped lower portion 176 of the lever 168, and that slot coacts with that ear to lock the lever 202 to the lever 168 while permitting rotation of those two levers relative to each other.

The numeral 210 denotes a second pivot which is secured to the lever 188; and that pivot rotatably secures a lever 212 to the lever 188. The lever 212 has an ear 214 thereon which is set at right angles to the plane of the inner face of the gear housing 110, and a second ear 216 is formed at the left-hand end of the ear 214. The lever 212 also has an ear 218 at the lower end thereof; and the ear 216 has an opening therein.

The numeral 220 denotes a helical extension spring which has the upper end thereof hooked around the shouldered pin 154 and has the lower end thereof hooked through an opening in the ear 181 on the lever 168. The numeral 222 denotes a helical extension spring which has one end thereof hooked through an opening in the ear 194 on the lever 188 and has the other end hooked through an opening in the ear 216 on the lever 212. The numeral 223 denotes a helical extension spring which has the upper end thereof hooked through an opening in the ear 196 on the lever 188 and has the lower end thereof hooked around the pin 162. The spring 220 biases the lever 168 for rotation in the clockwise direction as that lever is viewed in FIG. 10, but that spring can yield to permit rotation of that lever in the counter clockwise direction. The spring 222 biases the lever 212 for rotation in the clockwise direction in FIG. 10, but that spring can yield to permit rotation of that lever in the counter clockwise direction. The spring 223 biases the lever 188 for rotation in the clockwise direction in FIG. 10, but that spring can yield to permit rotation of that lever in the counter clockwise direction.

The numeral 224 denotes the output shaft of the gear train which is disposed within the gear housing 110. That gear train will provide a material reduction in speed between the input and output thereof; and hence the output shaft 224 will make only a few revolutions compared to the number of revolutions made by the shaft 118 of the motor 100. A cam 226 is fixedly secured on the shaft 224, and that cam has a generally circular periphery. An ear 228 projects outwardly from the generally circular periphery of the cam 226, as shown particularly by FIG. 10.

FIG. 10 shows by solid lines the positions which the various components of the motor 100 occupy when that motor is in its normal, de-energized position. Specifically, the upper ends of the slots 190 and 192 in the lever 188 are in engagement with the upper edges of the shouldered pins 158 and 160. The left-hand end of the slot 172 in the lever 168 abuts the left-hand edge of the shouldered pin 154, the lower end of the slot 206 in the lever 202 is adjacent the ear 182 on the lever 168, and the ear 214 on the lever 212 is in engagement with the ear 194 on the lever 188. Also, the cam 226 will have the ear 228 thereon disposed below the level of the roller 186 held by the pin 184, but that roller will be in the path of that ear.

Furthermore, the spring 136 will be holding the free end of the braking pawl 132 in the path of one of the ears 124 on the disc 122. That disc and the shaft 118 respond to energization of the coil 104 to tend to rotate in the counter clockwise direction in FIG. 10, and hence the free end of the braking pawl 132 will be in position to block that rotation. The shoulder 133 on the braking pawl 132 will be engaging the ear 142 on the lever 138 of magnetic material, and that shoulder will respond to the spring 136 to hold that lever away from the top of the stator 102. Also at this time, the ear 180 will be displaced from the stator 102. The weights 174 on the upwardly-extending T-shaped portion 170 of the lever 168 will statically balance that lever; and such balancing is desirable.

When the motor 100 is energized, the lever 138 of magnetic material will be attracted to the stator 102, and will cause its ear 142 to press hard enough on the shoulder 133 of the braking pawl 132 to overcome the bias of the spring 136. As a result, the free end of the braking pawl 132 will be moved downwardly out of the path of the ears 124 on the disc 122. Such movement will free the disc 122 and the shaft 118 for rotation in the counter clockwise direction; and that rotation will begin immediately. That rotation of the shaft 118 in the counter clockwise direction will act through the various gears of the gear train within the gear housing 110 to rotate the output shaft 224 of that gear train in the clockwise direction. As a result, the cam 226 will start rotating toward the dotted line position in FIG. 10; and as that cam reaches that dotted line position, the ear 228 thereon will engage the roller 186 and will rotate the lever 168 from the position shown in FIG. 10 to the position shown in FIG. 11. As that lever rotates to the position shown in FIG. 11, the ear 182 thereon will coact with the slot 206 in the rearwardly-offset lower portion of the lever 202 to rotate the latter lever in the counter clockwise direction about the pivot 200 carried by the lever 188. That rotation will shift the ear 208 on the lower portion of the lever 202 from the position shown by FIG. 10 to the position shown by FIG. 11; and in being shifted from the position shown by FIG. 10 to the position shown by FIG. 11, the ear 208 will be moved from a position where it is out of the path of the ear 228 on the cam 226 to a position where it is squarely in the path of that ear. Also as the lever 168 is rotated to the position shown by FIG. 11, the ear 180 on that lever will be moved into engagement with the stator 102.

After the ear 228 on the cam 226 engages the roller 186 held by the pin 184, and thus shifts the lever 168 from the position shown by FIG. 10 to the position shown by FIG. 11, the shaft 224 will continue to rotate in the clockwise direction and will move the ear 228 to the dotted line position in FIG. 11. As the ear 228 passes out from under the roller 186, that ear will free the lever 168 for rotation to its normal position under the influence of the spring 220; but the magnetic field of the coil 104 will act through the stator 102 to hold the ear 180 immediately adjacent that stator. As a result, even though the ear 228 on the cam 226 has moved beyond the roller 186, as shown by FIG. 11, the lever 168 will continue to remain in the shifted position shown by FIG. 11.

If the cycle-controlling mechanism of the device, with which the motor 100 is used, causes the coil 104 to become de-energized as the shaft 224 reaches the end of one complete revolution, as will normally be the case, the spring 136 will force the free end of the braking pawl 132 into the path of the ears 124 and will thereby halt rotation of the shaft 118. When the rotation of that shaft is halted, the rotation of the shaft 224 also will be halted. Also at that time, the spring 220 will be able to return the lever 168 to the position shown by FIG. 10. The returning movement of the lever 168 will act through the ear 182 thereon and through the slot 206 in the lever 202 to return the latter lever to its normal position. The overall result is that if the coil 104 becomes de-energized at the end of one complete revolution of the output shaft 224, as will normally be the case, the various components of the motor 100 will be restored to their normal positions.

However, if the coil 104 does not become de-energized after the output shaft 224 has made one complete revolution, the continued energization of that coil will hold the ear 180 adjacent the stator 102 of the motor 100. As a result the ear 182 on lever 168 and the slot 206 in the lever 202 will coact to hold the ear 208 squarely in the path of the ear 228 on the cam 226. Consequently, as that cam starts through a second revolution, the ear 228 thereon will move to the dotted line position in FIG. 12; and as it reaches that dotted line position it will engage the ear 208 on the lever 202. The ear 228 will then continue to rotate in the clockwise direction until it reaches the solid line position in FIG. 12; and as that ear moves to that position, it will move the ear 208 on the lever 202 to the position shown by FIG. 12. As the ear 208 is moved to the position shown by FIG. 12, it will apply a force through the lever 202 and the pivot 200 to the lever 188 which will force the latter lever to rotate in the counter clockwise direction about the shouldered pin 152. The spring 23 will yield to permit that rotation; and that rotation will be continued until the ear 214 on lever 212 engages the braking pawl 132 and has moved the free end of that braking pawl into the path of the ears 124 on the disc 122, as shown by FIG. 12. As a result, the next ear 124 that approaches the free end of the braking pawl 132 will be intercepted by that free end and will be held against further rotation. In this way, the shaft 118 will be held against rotation, and hence the shaft 224 also will be held against rotation. This means that shaft 224 will be unable to complete a second revolution; and this is desirable because the motor 100 should prevent two consecutive revolutions of the output shaft 224 without an intervening de-energization of the coil 104.

It will be noted that the ear 228 on the cam 226 in FIGS. 7–13 acts upon a linkage which causes the braking pawl 132 to block rotation of the shaft 118, whereas the ear 70 in FIGS. 1–6 directly blocks rotation of the output shaft 64. This means that the cam 68 in FIGS. 1–6 must withstand the torque applied by the output shaft 64, whereas all the cam 226 in FIGS. 7–13 need withstand is the torque applied by the shaft 118. Where the motor is small or of moderate size, as shown by FIGS. 1–6, the cam on the output shaft can withstand the torque applied by the output shaft; but where the motor is large, as shown by FIGS. 7-13, the cam on the output shaft may not be able to withstand the torque applied by the output shaft. The embodiment of invention shown in FIGS. 7–13 relieves the cam on the output shaft of the necessity of withstanding the torque applied by the output shaft, as by enabling that cam to act through a linkage to halt rotation of the shaft 118.

At the time the ear 214 on the lever 212 causes the braking pawl 132 to block further rotation of the shaft 118, the lever 188 will not be in its uppermost position. Instead, the lower ends of the slots 190 and 192 will be spaced short distances below the levels of the bottom edges of the shouldered pins 158 and 160. This means that the cam 226 could have coacted with the lever 202 to raise the lever 188 even higher; but that the braking pawl 132 stopped the shaft 118 before that cam and that lever could do so. Actually, the cam 226 is capable of raising the lever 188 high enough to enable the ear 228 on that cam to pass beneath and beyond the ear 208 on the lever 202; but the braking pawl 132 will stop rotation of the shaft 118 before that cam can raise the lever 188 that high. Only during the re-setting of the motor 100 will the cam 226 raise the lever 188 high enough to enable the ear 228 on that cam to pass beneath and beyond the ear 208 on the lever 202.

In the event the coil 104 becomes de-energized at the end of each revolution of the shaft 224, the lever 168 will return the ear 208 on the lever 202 to its normal position out of the path of the ear 228 on the cam 226; and the linkage which includes the lever 202, the lever 188 and the lever 212 will not be called upon to cause the braking pawl 132 to block rotation of the shaft 118. However, if the coil 104 does not become de-energized between successive revolutions of the output shaft 224, that linkage will be called upon to cause the braking pawl 132 to block further rotation of the shaft 118, and thus of the output shaft 224.

Once that linkage has blocked further rotation of the shaft 118, successive removals and applications of power to the coil 104, as by removing and replacing the fuse or by removing and replacing the plug of the device with which the motor 100 is used, will not release the shaft 118. This is due to the fact that the friction and mechanical advantage and inertia of the gear train within the gear housing 110 will enable the ear 228 on the cam 226 to continue to hold the lever 202, the lever 188 and the lever 212 in position to cause the upper end of the ear 214 to hold the free end of the braking pawl 132 in the path of the ears 124 on the disc 122. As a result, a service man will have to examine the device, with which the motor 100 is used, to locate the source of trouble which prevented the de-energization of the motor 100 intermediate the two revolutions of the output shaft 224 and will then have to re-set the motor 100. After that service man has eliminated that source of trouble, he can place a thumb or finger under the ear 218 on the lever 212 and rotate that lever to the position shown by FIG. 13. That rotation will move the upper end of the ear 214 downwardly and away from the braking pawl 132 and thereby free that braking pawl. The coil 104 will still be energized and will thus urge the lever 138 toward the stator 102; and as that lever moves into engagement with that stator, the ear 142 on that lever will act upon the shoulder 133 of the braking pawl 132 to move the free end of that braking pawl out of the path of the ears 124. Thereupon, the shaft 118 will resume its rotation in the counter clockwise direction, with consequent rotation of the output shaft 224 in the clockwise direction. That output shaft will then cause the cam 226 to raise the lever 188 high enough to enable the ear 228 on that cam to pass beneath and beyond the ear 208 on the lever 202; and thereafter that shaft will rotate to the position shown by FIG. 10 and come to rest as the coil 104 becomes de-energized. Subsequently, the motor 100 will provide any desired number of complete revolutions as long as the coil 104 becomes de-energized intermediate successive revolutions.

It will be noted that the magnetic fields of the coils 14 and 104 are, respectively, unable to pull the latch 42 and the lever 168 into proximity to the stators 12 and 102. However, those magnetic fields are able, after the latch 42 and the lever 168 have been moved into close proximity to the stators 12 and 102, to hold that latch and lever as long as the coils 14 and 104 are kept energized.

Whereas the drawing and accompanying description have shown and described two preferred embodiments of the present invention, it should be apparent to those skilled in the art that various changes may be made in the form of the invention without affecting the scope thereof.

What we claim is:

1. In a motor which has a stator and a coil and an output shaft that is intended to make one revolution and then come to rest and which keeps said output shaft from initiating and completing a second revolution without a de-energization of said coil intermediate the completion of a first revolution of said output shaft and the initiation of said second revolution of said output shaft and which has a cam on said output shaft that has an outwardly projecting ear, a pivot adjacent said output shaft, a latch of magnetic material that has on opening therein which telescopes over said pivot, said opening permitting said latch to rotate relative to said stator, a spring that biases said latch for rotation in one direction, an ear on said latch that is in register with a portion of said stator and that is normally spaced from said portion of said stator by the action of said spring but is movable adjacent said portion of said stator as said latch rotates in the opposite direction about said pivot, a roller that is rotatably mounted on said latch and that responds to the action of said spring to abut said cam whenever said cam and said latch are in their normal positions, said roller being in the path of said ear on said cam whenever said cam and said latch are in their normal positions, said ear on said cam engaging said roller on said latch during the rotation of said cam to rotate said latch in said opposite direction about said pivot until said ear on said latch is moved into position adjacent said portion of said stator, the magnetic field of said coil thereafter holding said ear on said latch adjacent said portion of said stator as long as said coil remains energized, and a second ear on said latch that is normally displaced from the path of said ear on said cam but that can be moved into the path of said ear on said cam and thus into position to block further rotation of said cam and said output shaft, said second ear on said latch being moved into position behind but in the path of said ear on said cam and thus into rotation-blocking position whenever said ear on said cam engages said roller and rotates said latch in said opposite direction, the first said ear on said latch being moved into position adjacent said portion of said stator as said ear on said cam engages said roller and rotates said latch in said opposite direction, said latch responding to said spring and to de-energization of said coil after the completion of a first revolution of said output shaft and prior to the initiation of a second revolution of said output shaft to move in said one direction to its normal position to move said second ear on said latch out of the path of said ear on said cam and thus out of rotation-blocking position, the first said ear on said latch remaining in position adjacent said portion of said stator and thereby holding said second ear on said latch in the patch of said ear on said cam in the event said coil does not become de-energized after the completion of said first revolution of said output shaft and before the initiation of said second revolution of said output shaft so said ear on said cam will engage and be held against further rotation, despite continued energization of the coil, by said second ear on said latch.

2. In a motor which has a stator and a coil and an output shaft that is intended to make one revolution and then come to rest and which keeps said output shaft from initiating and completing a second revolution without a de-energization of said coil intermediate the completion of a first revolution of said output shaft and the initiation of said second revolution of said output shaft and which has a cam on said output shaft that has an outwardly projecting ear, a pivot adjacent said output shaft, a latch of magnetic material that has on opening therein which telescopes over said pivot, said opening permitting said latch to rotate relative to said stator, a spring that biases said latch for rotation in one direction, an ear on said latch that is in register with a portion of said stator and that is normally spaced from said portion of said stator by the action of said spring but is movable adjacent said portion of said stator as said latch rotates in the opposite direction about said pivot, a portion of said latch that responds to the action of said spring to abut said cam whenever said cam and said latch are in their normal positions, said ear on said sam engaging said latch to rotate said latch in said opposite direction until said ear on said latch is adjacent said portion of said stator, the magnetic field of said coil thereafter holding said ear on said latch adjacent said portion of said stator as long as said coil remains energized, and an abutment on said latch that can be moved into the path of said ear on said cam and thus into position to block further rotation of said cam and said output shaft, said abutment on said latch being moved into position behind said ear on said cam and thus into rotation-blocking position whenever said ear on said latch is moved adjacent said portion of said stator, said latch responding to said spring and to de-energization of said coil after the completion of a first revolution of said output shaft and prior to the initiation of a second revolution of said output shaft to move in said one direction to move said abutment on said latch out of the path of said ear on said cam and thus out of rotation-blocking position, said ear on said latch remaining in position adjacent said portion of said stator and thereby holding said abutment on said latch in the path of said ear on said cam in the event said coil does not become de-energized after the completion of said first revolution of said output shaft so said ear on said cam will engage and be held against further rotation by said abutment on said latch.

3. In a motor which has a stator and a coil and an output shaft that is intended to make one revolution and then come to rest and which keeps said output shaft from initiating and completing a second revolution without a de-energization of said coil intermediate the completion of a first revolution of said output shaft and the initiation of said second revolution of said output shaft and which has a cam on said output shaft that has an outwardly projecting ear, a latch of magnetic material that is mounted adjacent said stator and adjacent said cam, a spring that biases said latch for movement in one direction, a portion of said latch that is in register with a portion of said stator and that is movable adjacent said stator as said latch moves in the opposite direction, a second portion of said latch that responds to the action of said spring to abut said cam whenever said cam and said latch are in their normal positions, said ear on said cam engaging said latch to move said latch in said opposite direction until the first said portion of said latch is adjacent said portion of said stator, the magnetic field of said coil thereafter holding the first said portion of said latch adjacent said portion of said stator as long as said coil remains energized, and an abutment on said latch that can be moved into the path of said ear on said cam and thus into position to block further rotation of said cam and said output shaft, said abutment on said latch being moved into position behind said ear on said cam and thus into rotation-blocking position whenever the first said portion of said latch is moved adjacent said portion of said stator, said latch responding to said spring and to de-energization of said coil after the completion of a first revolution of said output shaft and prior to the initiation of a second revolution of said output shaft to move in said one direction to move said abutment on said latch out of the path of said ear on said cam and thus out of rotation-blocking position, the first said portion of said latch remaining in position adjacent said portion of said stator and thereby holding said abutment on said latch in the patch of said ear on said cam in the event said coil does not become de-energized after the completion of said first revolution of said output shaft so said ear on said cam will engage and be held against further rotation by said abutment on said latch.

4. In a motor which has a stator and a coil and an output shaft that is intended to make one revolution and then come to rest and which keeps said output shaft from initiating and completing a second revolution without de-energization of said coil intermediate the completion of a first revolution of said output shaft and the initiation of said second revolution of said output shaft and which has a cam on said output shaft, a latch of magnetic material that is mounted adjacent said stator and adjacent said cam, said latch being biased for movement in one direction but responding to rotation of said cam to move in the opposite direction, a portion of said latch that is movable into the magentic field of said coil as said latch moves in said opposite direction, said cam engaging a second portion of said latch to move said latch in said opposite direction until the first said portion of said latch is in position to be held by said magnetic field of said coil, the magnetic field of said coil thereafter holding said latch against returning movement to its normal position as long as said coil remains energized, and a third portion on said latch that moves into position to block a second revolution of said cam whenever said cam moves the first said portion of said latch into the magnetic field of said coil, said latch returning to its normal position after the completion of the first said revolution of said output shaft if said coil is de-energized and thereby moving said third portion of said latch out of blocking position but said latch remaining in cam-blocking position if said coil is not de-energized.

5. In a motor which has a stator and a coil and an output shaft that is intended to make one revolution and then come to rest and keeps said output shaft from initiating and completing a second revolution without a de-energization of said coil intermediate the completion of a first revolution of said output shaft and the initiation of said second revolution of said output shaft and which has a cam on said output shaft, a latch of magnetic material which has a portion thereof engageable by said cam during said first revolution of said output shaft to move said latch into the magnetic field of said coil, said latch having an abutment thereon that is moved into position behind said cam but in the path of said cam and thus into rotation-blocking position as said cam moves said latch into said magnetic field of said coil, said magnetic field holding said abutment on said latch in rotation-blocking position as long as said coil is energized, said abutment intercepting and holding said cam against further rotation, and thereby holding said output shaft of said motor against further rotation, in the event continued energization of said coil holds said latch in said magnetic field of said coil and thus holds said abutment in rotation-blocking position, said abutment moving out of the path of said cam, and thereby permitting further rotation of said output shaft, in the event said motor is de-energized after the completion of a first revolution of said output shaft and before the initiation of a second revolution of said output shaft.

6. In a motor which has a stator and a coil and an output shaft that is intended to make one revolution and then come to rest and which keeps said output shaft from initiating and completing a second revolution without a de-energization of said coil intermediate the completion of a first revolution of said output shaft and the initiation of said second revolution of said output shaft and which has a cam on said output shaft, a latch of magnetic material which has a portion thereof engageable by said cam during said first revolution of said output shaft to move said latch into the magnetic field of said coil, said latch having a second portion thereof that is moved into position to block a second revolution of said cam as said cam moves said latch into said magnetic field of said coil, said magnetic field holding said second portion of said latch in rotation-blocking position as long as said coil is energized, said second portion of said latch blocking a second revolution of said cam and of said output shaft in the event continued energization of said coil holds said latch in said magnetic field of said coil and thus holds said abutment in rotation-blocking position, said second portion of said latch moving out of blocking position in the event said motor is de-energized after the completion of a first revolution of said output shaft and before the initiation of a second revolution of said output shaft.

7. In a motor which has a stator and a coil and an output shaft that is intended to make one revolution and then come to rest and which keeps said output shaft from initiating and completing a second revolution without a de-energization of said coil intermediate the completion of a first revolution of said output shaft and the initiation of said second revolution of said output shaft and which has a cam on said output shaft, a pivot adjacent said output shaft, a latch of magnetic material that is rotatably mounted on said pivot, said cam responding to rotation of said output shaft to rotate said latch into the magneic field of said coil, an abutment on said latch that is moved into position to block a second revolution of said cam as said cam moves said latch into the magnetic field of said coil, said magnetic field holding said abutment on said latch in rotation-blocking position as long as said coil is energized, said abutment intercepting and holding said cam against further rotation, and thereby holding said output shaft of said motor against further rotation, in the event continued energization of said coil holds said latch in said magnetic field of said coil, said cam subsequently blocking the return of said latch to its normal position even though said coil subsequently becomes de-energized.

8. In a motor which has a stator and a coil and an output shaft that is intended to make one revolution and then come to rest and which keeps said output shaft from initiating and completing a second revolution without a de-energization of said coil intermediate the completion of a first revolution of said output shaft and the initiation of said second revolution of said output shaft and which has a cam on said output shaft, a pivot adjacent said output shaft, a latch that is responsive to magnetic flux lines and that is rotatably mounted on said pivot, said cam responding to rotation of said output shaft to rotate said latch into the magnetic field of said coil, an abutment on said latch that is moved into position to block a second revolution of said cam as said cam moves said latch into the magnetic field of said coil, said magnetic field holding said abutment on said latch in rotation-blocking position as long as said coil is energized, said abutment intercepting and holding said cam against further rotation, and thereby holding said output shaft of said motor against further rotation, in the event continued energization of said coil holds said latch in said magnetic field of said coil.

9. In a motor which has a stator and a coil and an output shaft that is intended to make one revolution and then come to rest and which keeps said output shaft from initiating and completing a second revolution without a de-energization of said coil intermediate the completion of a first revolution of said output shaft and the initiation of said second revolution of said output shaft and which has a cam on said output shaft, a pivot adjacent said output shaft, a lever that can respond to magnetic flux lines and that is rotatably mounted on said pivot, said cam responding to rotation of said output shaft to rotate said lever into the magnetic field of said coil, an abutment on said lever that is moved into position where it can cause blocking of a second revolution of said cam as said cam moves said lever into said magnetic field of said coil, said magnetic field holding said abutment on said lever in rotation-blocking position as long as said coil is energized, said abutment causing the blocking of further rotation of said output shaft of said motor in the event continued energization of said coil holds said lever in said magnetic field of said coil.

10. In a motor which has a stator and a coil and an output shaft that is intended to make one revolution and then come to rest and which keeps said output shaft from initiating and completing a second revolution without a de-energization of said coil intermediate the completion of a first revolution of said output shaft and the initiation of said second revolution of said output shaft and which has a cam on said output shaft and a member that is movable into and out of position to prevent further rotation of said output shaft of said motor despite continued energization of said coil, said cam on said output shaft of said motor responding to rotation of said output shaft during each revolution of said output shaft to cause said member to move into said said position to prevent further rotation of said output shaft of said motor, said cam freeing said member before the end of each revolution of said output shaft to enable said member to move out of rotation-blocking position in the event said coil becomes de-energized at the end of said revolution of said output shaft, said member remaining in said position to prevent further rotation of said output shaft of said motor in the event said coil fails to become de-energized at the end of a revolution of said output shaft.

11. In a motor which has a stator and a coil and an output shaft that is intended to make one revolution and then come to rest and which keeps said output shaft from initiating and completing a second revolution without a de-energization of said coil intermediate the completion of a first revolution of said output shaft and the initiation of said second revolution of said output shaft and which has a cam on said output shaft, a member that can be moved into a position that will cause a second revolution of said cam, without an intervening movement at said member out of said position, to result in blocking of further rotation of said output shaft, said cam responding to rotation of said output shaft during the first revolution of said output shaft to force said member to move into said position, said member being responsive to magnetic lines of flux and responding to lines of flux from said coil to remain in said position as long as said coil remains energized, said member moving out of said position when said coil is de-energized, whereby said member responds to rotation of said cam during the first revolution of said output shaft to move into said position and responds to the magnetic field of said coil to remain in said position until said coil is de-energized and moves out of said position when said coil is de-energized.

12. In a motor which has a stator and a coil and an output shaft and which is adapted to keep said output shaft from initiating and completing a second revolution without a de-energization of said coil intermediate the completion of a first revolution of said output shaft and the initiation of said second revolution of said output shaft and which has a cam on said output shaft, a pivot adjacent said output shaft, a lever that can respond to magnetic lines of flux and that is rotatably mounted on said pivot, a second lever that is rotatably mounted on said pivot, a second pivot that is carried by said second lever, a third lever that is rotatably mounted on said second pivot, interacting surfaces on the first said and said third levers that normally enable the first said lever to hold said third lever out of the path of said cam but that respond to movement of said first lever to a predetermined position to move said third lever into the path of said cam, said cam acting during each revolution of said output shaft that follows a de-energization of said coil to move said first lever into said predetermined position and thereby move said third lever into the path of said cam, a third pivot that is carried by said second lever, a fourth lever that is rotatably mounted on said third pivot, and a stop that is movable into position to block rotation of the rotor-supporting shaft of said motor, said second lever responding to engagement of said third lever by said cam to cause said fourth cam to move said stop into said position to block rotation of said rotor-supporting shaft of said motor, said first lever responding to continued energization of said coil to remain in said predetermined position and thereby to continue to hold said third lever in the path of said cam.

13. In a motor which has a stator and a coil and an output shaft and which is adapted to keep said output shaft from initiating and completing a second revolution without a de-energization of said coil intermediate the completion of a first revolution of said output shaft and the initiation of said second revolution of said output shaft and which has a cam on said output shaft, a pivot adjacent said output shaft, a lever that can respond to magnetic lines of flux and that is rotatably mounted on said pivot, a second lever that is rotatably mounted on said pivot, a second pivot that is carried by said second lever, a third lever that is rotatably mounted on said second pivot, interacting surfaces on the first said and said third levers that normally enable the first said lever to hold said third lever out of the path of said cam but that respond to movement of said first lever to a predetermined position to move said third lever into the path of said cam, said cam acting during each revolution of said output shaft that follows a de-energization of said coil to move said first lever into said predetermined position and thereby move said third lever into the path of said cam, a third pivot that is carried by said second lever, a fourth lever that is rotatably mounted on said third pivot, and a stop that is movable into position to block rotation of the rotor-supporting shaft of said motor, said second lever responding to engagement of said third lever by said cam to cause said fourth cam to move said stop into said position to block rotation of said rotor-supporting shaft of said motor, said first lever responding to continued energization of said coil to remain in said predetermined position and thereby to continue to hold said third lever in the path of said cam, said fourth lever subsequently being rotatable to release said stop even though said third lever is engaged by said cam.

14. In a motor which has a stator and a coil and an output shaft that is intended to make one revolution and then come to rest and which keeps said output shaft from initiating and completing a second revolution without a de-energization of said coil intermediate the completion of a first revolution of said output shaft and the initiation of said second revolution of said output shaft and which has a cam on said output shaft, a member that is movable to a predetermined position to prevent further rotation of said output shaft, and an abutment that is normally out of the path of said cam but that is movable into the path of said cam during the first revolution of said output shaft, the flux lines from said coil holding said abutment in said path of said cam while said coil is energized, said abutment responding to continuous energization of said coil and to the resulting uninterrupted rotation of said cam to prevent further rotation of said output shaft, said coil normally becoming de-energized at the end of each revolution of said output shaft, whereby said abutment is normally freed for movement out of said path of said cam before the end of each revolution of said output shaft and thus normally does not prevent further rotation of said output shaft.

15. In a motor which has a stator and a coil and an output shaft that is intended to make one revolution and then come to rest and which keeps said output shaft from initiating and completing a second revolution without a de-energization of said coil intermediate the completion of a first revolution of said output shaft and the initiation of said second revolution of said output shaft and which has a cam on said output shaft, a member that is movable to a predetermined position to prevent further rotation of said output shaft, and an abutment that is normally out of the path of said cam but that is movable into the path of said cam during the first revolution of said output shaft, the flux lines from said coil holding said abutment in said path of said cam while said coil is energized, said abutment responding to continuous energization of said coil and to the resulting uninterrupted rotation of said cam to move said movable member into said predetermined position to prevent further rotation of said output shaft, said abutment being on said movable member.

16. In a motor which has a stator and a coil and an output shaft and which is adapted to keep said output shaft from initiating and completing a second revolution without a de-energization of said coil intermediate the completion of a first revolution of said output shaft and the initiation of said second revolution of said output shaft and which has a cam on said output shaft, a member that is movable to a predetermined position to prevent further rotation of said output shaft, and an abutment that is normally out of the path of said cam but that is movable into the path of said cam during the first revolution of said output shaft, and that will remain in said path of said cam while said coil is energized and that will respond to uninterrupted rotation of said cam to move said movable member into said predetermined position to prevent further rotation of said output shaft, said abutment being on a part of a linkage that can transmit force from said cam to said movable member to move said movable member into said predetermined position to prevent further rotation of said output shaft.

17. In a motor which has a stator and a coil and an output shaft and which is adapted to keep said output shaft from initiating and completing a second revolution without a de-energization of said coil intermediate the completion of a first revolution of said output shaft and the initiation of said second revolution of said output shaft and which has a cam on said output shaft, a member that is movable to a predetermined position to prevent further rotation of said output shaft, and an abutment that is normally out of the path of said cam but that is movable into the path of said cam during the first revolution of said output shaft, and that will remain in said path of said cam while said coil is energized and that will respond to uninterrupted rotation of said cam to move said movable member into said predetermined position to prevent further rotation of said output shaft, said abutment being on a part of a linkage that can transmit force from said cam to said movable member to move said movable member into said predetermined position to prevent further rotation of said output shaft, said linkage including an element that can be moved to disable said linkage and permit further rotation of said output shaft even though said cam is applying force to said linkage.

18. In a motor which has a stator and a coil and an output shaft and which is adapted to keep said output shaft from initiating and completing a second revolution without a de-energization of said coil intermediate the completion of a first revolution of said output shaft and the initiation of said second revolution of said output shaft and which has a cam on said output shaft, a member that is movable to a predetermined position to prevent further rotation of said output shaft, and an abutment that is normally out of the path of said cam but that is movable into the path of said cam during the first revolution of said output shaft, and that will remain in said path of said cam while said coil is energized and that will respond to uninterrupted rotation of said cam to move said movable member into said predetermined position to prevent further rotation of said output shaft, said abutment being on a part of a linkage that can transmit force from said cam to said movable member to move said movable member into said predetermined position to prevent further rotation of said output shaft, at least one part of said linkage being responsive to magnetic flux lines and responding to uninterrupted energization of said coil to hold said abutment in said path of said cam after said abutment has been moved in said path of said cam.

19. In a motor which has a stator and a coil and an output shaft that is intended to make one revolution and then come to rest and which keeps said output shaft from initiating and completing a second revolution without a de-energization of said coil intermediate the completion of a first revolution of said output shaft and the initiation of said second revolution of said output shaft and which has a cam on said output shaft, a stop that can be moved to a predetermined position to prevent further rotation of said output shaft despite continued energization of said coil, and an abutment that is movable relative to said output shaft and relative to said cam, said abutment normally being displaced from the path of said cam, said abutment responding to rotation of said cam during the first revolution of said output shaft to move into said path of said cam, the lines of flux from said coil causing said abutment to remain in said path of said cam while said coil remains continuously energized but permitting said abutment to move back out of said path of said cam if said coil becomes de-energized, said abutment responding to continuous energization of said coil and to the resulting uninterrupted rotation of said cam to prevent further rotation of said output shaft, said coil normally becoming de-energized at the end of each of the complete revolutions of said output shaft, whereby said abutment is normally freed for movement out of said path of said cam before the end of each revolution of said output shaft and thus normally does not prevent further rotation of said output shaft.

20. In a motor which has a stator and a coil and an output shaft that is intended to make one revolution and then come to rest and which keeps said output shaft from initiating and completing a second revolution without a de-energization of said coil intermediate the completion of a first revolution of said output shaft and the initiation of said second revolution of said output shaft and which comprises means that can respond to magnetic lines of flux and that can be moved into a position which will cause a second revolution of said output shaft, without an intervening de-energization of said coil, to result in blocking of further rotation of said output shaft, said coil being energized to initiate a first revolution of said output shaft and normally being de-energized close to the end of said first revolution of said output shaft, said means responding to rotation of said output shaft during said first revolution of said output shaft to move into said position, said means responding to the de-energization of said coil which normally occurs close to the end of said first said revolution of said output shaft to move out of said position and thereby permit the initiation of a further revolution of said output shaft.

References Cited by the Examiner

UNITED STATES PATENTS 2,539,836 1/1951 Hoffmann ----------- 310—77

MILTON O. HIRSHFIELD, *Primary Examiner.*